United States Patent [19]
Zurasky

[11] 3,737,237
[45] June 5, 1973

[54] MONITORING DEPOSITION OF FILMS
[75] Inventor: James L. Zurasky, Hunstville, Ala.
[73] Assignee: The United States of America as represented by the Secretary of the Administrator of the National Aeronautics and Space Administration, Washington, D.C.
[22] Filed: Nov. 18, 1971
[21] Appl. No.: 200,085

[52] U.S. Cl. ............... 356/161, 356/108, 356/202, 250/219 TH
[51] Int. Cl. ........................................... G01b 11/00
[58] Field of Search ................... 356/161, 108; 250/219 TH

[56] References Cited
UNITED STATES PATENTS

| | | | |
|---|---|---|---|
| 2,973,686 | 3/1961 | Dreyfus et al. | 250/219 TH |
| 3,017,512 | 1/1962 | Wolbert | 356/161 |
| 3,238,839 | 3/1966 | Day, Jr. | 250/219 TH |
| 3,322,962 | 5/1967 | Muller | 356/161 |
| 3,439,175 | 4/1969 | Kammuller | 356/161 |

OTHER PUBLICATIONS

"Alternating Wavelength Vampo" By Pliskin et al. IBM Tech. Bltn. Vol. 13 No. 3 Aug. 1970

Primary Examiner—Ronald L. Wibert
Assistant Examiner—Paul K. Godwin
Attorney—L. D. Wofford, Jr., W. H. Riggins and J. R. Manning

[57] ABSTRACT

A system using dual wavelength characteristics of light passing through a film being deposited to generate an output signal that changes rapidly at the point when the deposition process should stop or change. Photodetectors are used to sense the light intensity changes at the two wavelengths and the monitored signal represents the ratio of their sums and difference signal strengths.

3 Claims, 3 Drawing Figures

MONITORING DEPOSITION OF FILMS

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

Field of the Invention

The invention relates to the art of monitoring the thickness of thin films for optics so as to obtain a desired optical characteristic.

Description of the Prior Art

A thin film on a substrate changes the character of the light reflected or transmitted by the substrate. Often, to achieve desired optical properties, it is necessary to have multilayers of thin layers on a substrate to act on the transmitted or reflected light. The thickness of the film layer is critical and the film deposition process must be stopped or changed at a very precise point to achieve the proper thickness which results in the desired optical property.

One of the better methods of monitoring the deposition process of films on a substrate uses a photodetector to measure the intensity of the light transmitted or reflected through the film. The thickness of the film having been correlated by previous techniques to the intensity of such light reflected or transmitted. The difficulty with the method is that an error is most often introduced by having a stopping point which not only necessarily requires an overshoot to determine that a stopping point has been reached but having a changing light intensity at the desired film thickness which is so slight that it is difficult to know when the stopping point has occurred.

Accordingly, it is an object of the present invention to provide a very precise monitoring system for thin film deposition.

Another object is to provide a dual wavelength light monitoring system which produces a very rapid changing signal near the desired stopping point in the deposition of the film layer.

Other objects and advantages of the present invention will become more apparent as the description proceeds.

SUMMARY OF THE INVENTION

A dual-wavelength system for monitoring the fabrication of high-quality optical filters and other highly precise film deposition operations. A light beam is passed or reflected through a thin film being deposited and the resulting light beam is divided into two separated beams. Each of the divided branches of the light beam is passed through an independent system having a filter to pass a certain wavelength light to a photodetector to measure the light intensity at that wavelength. Both signals from the photodetector are inputed into a sum and difference amplifier to provide a ratio signal that is rapidly changing at the point where the film deposition must be stopped or changed. If a filter is being manufactured, the light filters selected for the system are such that one passes light having a wavelength slightly less than the designed wavelength and the other passes light having a wavelength slightly greater.

This will become apparent upon reference to the following drawings and description.

DESCRIPTION OF THE PREFERRED EMBODIMENT

Figure 1:
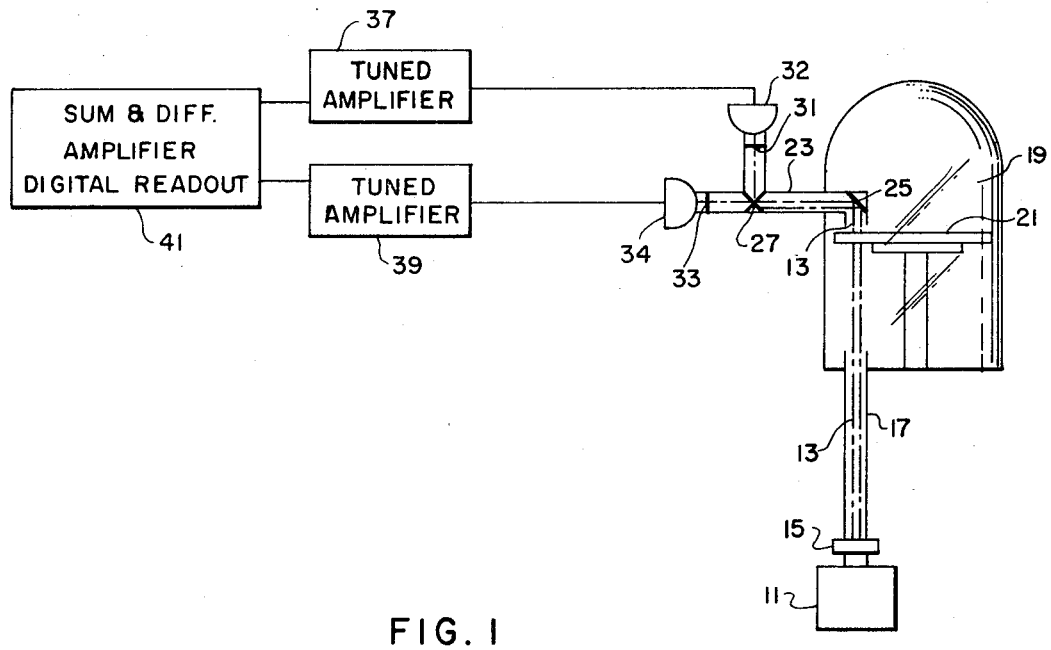
FIG. 1 illustrates the monitoring system of the present invention for light transmitted through the film being deposited

Referring now to FIG. 1 wherein is illustrated a system for monitoring the film deposition in an evaporation chamber. A light source 11 with focusing lens projects a collimated light beam 13, that is modulated by a chopper 15, through a lower tube 17 leading into the evaporation chamber 19. The modulated light beam 13 passes through a substrate and film 21 being deposited thereon and into an upper tube 23 which contains a mirror 25 that reflects the light beam 13 toward a dichroic filter 27 that reflects light having a wavelength greater than a certain wavelength toward a first select filter 31 and photodetector 32 arrangement and passes light having a wavelength less than a certain wavelength toward a second select filter 33 and photodetector 34 arrangement. While a beam splitter could be used rather than a dichroic filter 27, the dichroic filter is preferred because it assures an adequate light beam will be directed to a specific filter and photodetector arrangement.

The first filter 31 is selected to pass the light of a wavelength slightly greater than the filter being made in the evaporation chamber 19 toward the first photodetector 32. The second filter 33 is selected to pass the light of a wavelength slightly less than the filter being made toward the second photodetector 34. For example, if a five layer filter for light transmissions having a wavelength of 5893 angstroms (A) is being made, the first filter 31 could be selected to transmit light having a transmission wavelength of 6600 (A) and the second filter 33 could be selected to have a transmission wavelength of 5461 A, with the dichroic mirror 27 separating the light at the 6000 A wavelength.

The signals from the photodetectors 32, 34 represents the light intensity received at the select wavelengths of the filters 31, 33 and the signals are amplified and filtered to have any noise removed by tuned amplifiers 37, 39 associated with each photodetector. The modulation of the light by the beam chopper 15 assures that the correct light is being identified and amplified by the tuned amplifiers 37, 39.

Figure 3:
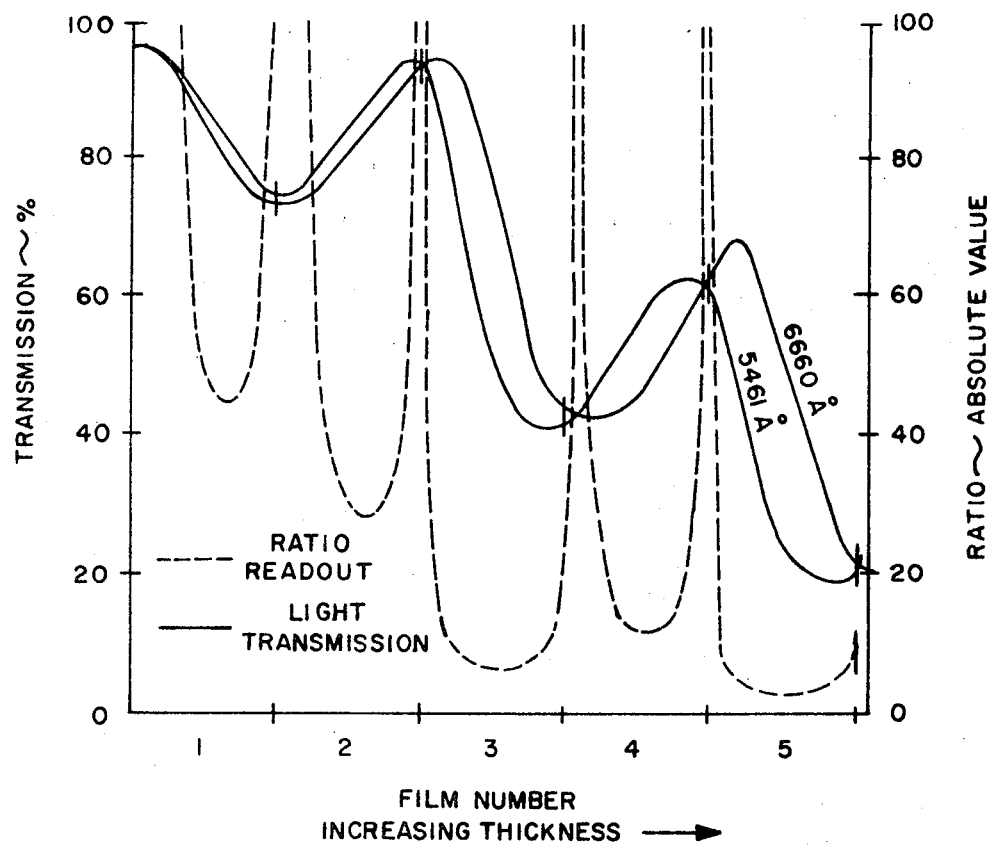
FIG. 3 is a graph of a ratio readout curve for a five layer filter.

The output of the tuned amplifiers 37, 39 are both inputed into a sum and difference amplifier and digital readout device 41 which gives a ratio readout of the sum of the signal strength from both amplifiers 37, 39 and the difference in signal strength from both amplifiers 37, 39. As indicated by FIG. 3 the light transmission of the select wavelengths changes very little as the desired film thickness is obtained which would normally make it difficult to determine the desired stopping point. As the ratio readout of the sum and difference between the signals is very large and changes very rapidly the desired stopping point can readily be identified.

The graph is plotted for five layers using the first filter of 6600 A and the second filter of 5461 A.

Figure 2:
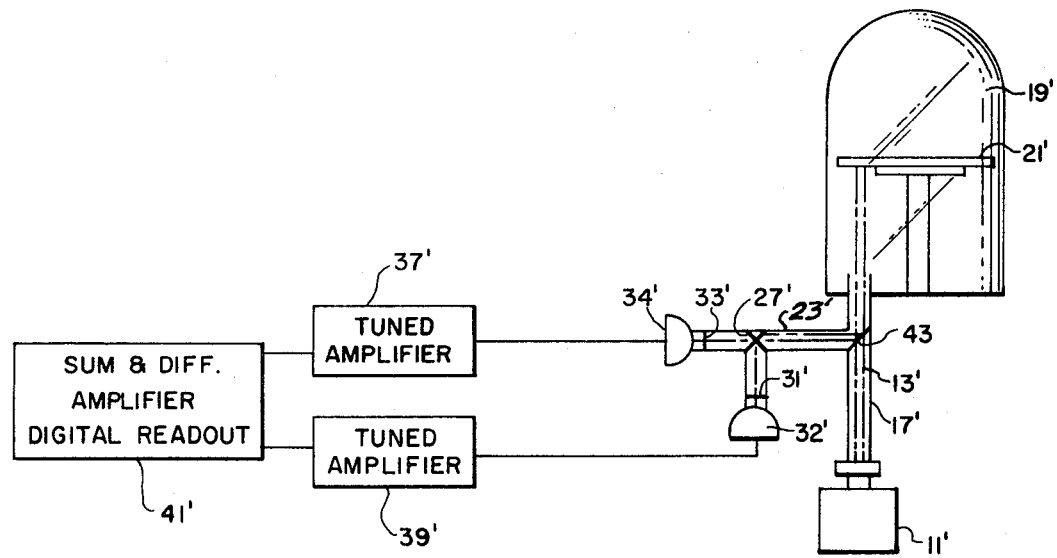
FIG. 2 illustrates the similar monitoring system for light reflected through the film being deposited.

Obviously, many modifications and variations of the present invention are possible in light of the above teachings. As indicated by FIG. 2 in which the primed numbers corresponds to the numbers of FIG. 1, the same arrangement may be made to monitor the reflected light from the substrate in which the reflected light passes through the film being deposited and is directed into the output tube 23' by the addition of a beam splitter 43. It is to be understood that within the scope of the appended claims the invention may be practiced other than as specifically claimed.

What is claimed is:

1. A monitor for determining the thickness of a thin film being deposited, comprising:
    a light source which directs a light beam so it will be incident on the film being deposited,
    a dichroic filter to split the resulting light beam acted upon by said film so that said resulting light beam is divided into two branch light beams of differing wavelengths,
    a first filter of a known light transmission wavelength acting upon one of said branch light beams,
    a second filter of a known light transmission wavelength acting upon the other of said branch light beams,
    a first means for producing an electrical signal representative of the intensity of light transmitted by said first filter,
    a second means for producing an electrical signal representative of the intensity of light transmitted by said second filter,
    a readout device which receives said electrical signals of said first and second means and gives a ratio readout of the sum and difference of said electrical signals which readout changes rapidly at the point where film deposition must be stopped or changed.

2. A monitor according to claim 1 wherein:
    said light source projects a collimated modulated light beam.

3. A monitor for deposition of thin films in an evaporation chamber, comprising:
    a light source which directs a collimated light beam into said evaporation chamber so said light beam will be incident on the thin film being deposited,
    a mirrow device for reflecting the resulting light beam acted upon by said film into a dichroic filter so that said resulting beam is divided into two branch light beams,
    one of the branch light beams being directed through a first filter of a known transmission wavelength, and the other of said branch light beams being directed through a second filter of a slightly different transmission wavelength,
    a first photodetector means for producing an electrical signal representative of the light transmitted by said first filter,
    a second photodector means for producing an electrical signal representative of the light transmitted by said second filter, and
    an amplifier and readout device for receiving said electrical signals from said first and second photodetectors for giving a ratio readout of the sum and difference between said two electrical signals which readout rapidly changes at the point where film deposition must be stopped or changed.

* * * * *